United States Patent
Salesse et al.

(10) Patent No.: US 7,287,628 B2
(45) Date of Patent: Oct. 30, 2007

(54) HIGH PERFORMANCE DEVICE FOR BALANCING A FORCE

(76) Inventors: Christian Salesse, 10, rue du Pilat, F-07100 Annonay (FR); Jean-Marc Loriot, 15, rue Lakanal, F-75015 Paris (FR)

(*) Notice: Subject to any disclaimer, the term of this patent is extended or adjusted under 35 U.S.C. 154(b) by 673 days.

(21) Appl. No.: 10/380,411

(22) PCT Filed: Sep. 12, 2001

(86) PCT No.: PCT/FR01/02835
§ 371 (c)(1),
(2), (4) Date: Sep. 11, 2003

(87) PCT Pub. No.: WO02/22322
PCT Pub. Date: Mar. 21, 2002

(65) Prior Publication Data
US 2004/0045390 A1  Mar. 11, 2004

(30) Foreign Application Priority Data
Sep. 14, 2000 (FR) .................................. 00 11733
Dec. 1, 2000 (FR) .................................. 00 15586

(51) Int. Cl.
*B60L 5/00* (2006.01)
(52) U.S. Cl. .......................... 191/64; 191/65; 191/66; 414/680
(58) Field of Classification Search .......... 191/64, 191/65, 66, 68, 59.1, 67, 86; 414/680, 728, 414/742, 744.1; 901/15, 48; 254/45, 46; 74/490.01, 490.05, 490.14
See application file for complete search history.

(56) References Cited

U.S. PATENT DOCUMENTS
3,761,648 A * 9/1973 Horstmeier et al. .......... 191/70
4,901,591 A   2/1990 Oppermann et al.

FOREIGN PATENT DOCUMENTS

| FR | 27768 | 8/1924 |
|----|-------|--------|
| FR | 2 483 300 | 12/1981 |
| FR | 2 608 959 | 7/1988 |
| FR | 2 627 718 | 9/1989 |
| FR | 2 637 832 | 4/1990 |
| GB | 2 030 108 | * 4/1980 |
| JP | 57-132988 | 8/1982 |

OTHER PUBLICATIONS
International Search Report for PCT/FR01/02835, dated Jan. 2, 2002.
International Preliminary Examination Report of PCT/FR01/02835, dated Apr. 29, 2002.
* cited by examiner

*Primary Examiner*—Mark T. Le
(74) *Attorney, Agent, or Firm*—Christie, Parker & Hale, LLP

(57) ABSTRACT

A device for balancing a force. The device includes an articulated mechanism (10). The articulated mechanism (10) includes a proximal arm (12) borne by a support wedged on a first hinge pin (20) and a distal arm (14) borne by the proximal arm and wedged on a second hinge pin (24) extending parallel to the first pin. The distal arm has a free end (26) supporting a load (F). The device further includes first balancing means (18,20) with high bandwidth acting on the proximal arm (12), second balancing means (18,22) with high bandwidth acting on the distal arm (4), and coordinating means interposed between the first balancing means and the second balancing means to coordinate rotational movements of the proximal arm and the distal arm.

17 Claims, 5 Drawing Sheets

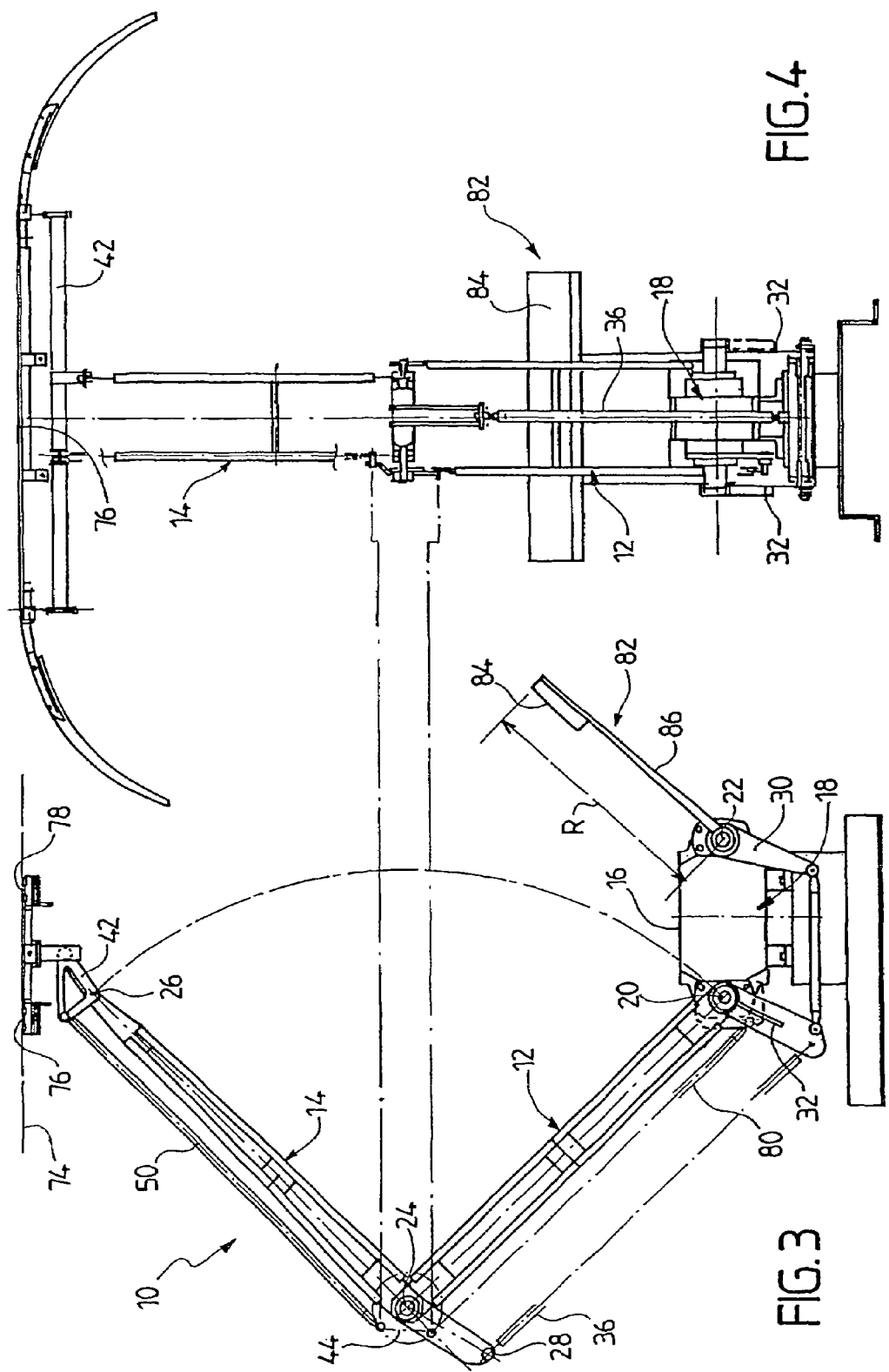

HIGH PERFORMANCE DEVICE FOR BALANCING A FORCE

CROSS-REFERENCE TO RELATED APPLICATION

This application is a National Phase Patent Application of International Application Number PCT/FR01/02835, filed on Sep. 12, 2001, which claims priority of French Patent Application Number 00/11733, filed Sep. 14, 2000, and French Patent Application Number 00/15586, filed Dec. 1, 2000.

The invention relates to a device for balancing a force, which is capable of guiding a load over a given trajectory, in particular a linear trajectory.

Balancing devices of this type are already known which comprise an articulated mechanism formed by a proximal arm carried by a support and keyed on a first hinge pin and a distal arm carried by the proximal arm and keyed about a second hinge pin extending parallel to the first pin, the distal arm having a free end carrying a load.

A balancing device with two articulated arms of this type has numerous applications, in particular in the field of handling devices, transfer devices, etc. It may also be used as a pantograph, in particular a railway pantograph for electric locomotives.

Various solutions are already known for balancing the load carried by the articulated mechanism.

In the first instance, pneumatic solutions are known which employ a jack for suspending and/or moving the load, for example in a vertical direction.

Although these solutions give relatively satisfactory results with light loads, they become impossible to manage once the volume of air in the jack exceeds about 1 dm$^3$. This is due to the losses of loads which lead to pressure variations between the various points of the circuit and to the compressibility of air. Pneumatic means of this type have the drawback of having a response time of approximately 1 second, and this corresponds to a mediocre bandwidth value, in other words a time which is too great not to be felt, in particular by an operator.

Mixed solutions are also known, in which a pneumatic system is coupled to a counterweight. These solutions, which lead to the same results as the previous solutions, also have the drawback of a significant increase in the inertia, and this may also affect the horizontal movements of the load.

In addition, electrical solutions are known which generally involve the use of types of tackle with automatic load control. These solutions have the drawbacks, on the one hand, of sophisticated systems (risk of breakdown) and, on the other hand, of requiring a weighing phase during which the load is not controlled and may be dangerous for the operator. These solutions have the further drawback of having a long response time which is incompatible in practice with convenient handling on account of their low bandwidth. This applies, in particular, if this movement necessitates the control of a position which is not represented physically, and hence the presence of a position loop.

Furthermore, solutions employing a parallelogram are known, as defined in French patent application No. 00 03047, and have the drawbacks, on the one hand, of not effecting guidance (as with a cable) or of necessitating an arcuate trajectory in a vertical plane and, on the other hand, of concentrating all the forces associated with the weight on a single arm of the parallelogram. The solution described in French patent No. 96 07556 employs a parallelogram but does not comprise a means of coordination. Therefore, the bandwidth of the assembly cannot be taken for granted, whatever the quality of the balancing means.

The object of the invention is, in particular, to overcome the aforementioned drawbacks.

It aims, in particular, to provide a high performance device for balancing a force, for guiding a load over a trajectory with a high bandwidth.

Accordingly, it proposes a device for balancing a force of the type defined at the outset, which comprises first high bandwidth balancing means having a first output shaft and acting on the proximal arm, second high bandwidth balancing means having a second output shaft and acting on the distal arm as well as high bandwidth coordinating means interposed between the first balancing means and the second balancing means to coordinate the respective rotational movements of the proximal arm and of the distal arm.

Therefore, the invention allows the proximal arm and the distal arm of the articulated mechanism to be balanced separately, owing to first balancing means and second balancing means which are coordinated with one another. This minimises the inertia brought back to the balancing system and the elasticity of transmission of the proximal arm and the distal arm.

These balancing means have a high bandwidth, meaning a bandwidth of about 100 Hertz, without adding considerable friction and inertia.

As a reminder, the bandwidth translates the ability of a mechanical system to react to transient phenomena. In practice, it translates the ability of said system to maintain its performance when subjected to stresses which, in the present case, may be of approximately 100 Hertz, and this may also be defined as a response time of approximately 100th of a second.

In the scope of the invention, various types of balancing means may be used, including motorisation means in certain cases.

In a preferred embodiment of the invention, the device comprises a balancer capable of providing a sinusoidal mechanical torque and having two output shafts which have speeds of rotation which are synchronised but in opposite directions, and in which these output shafts are rotationally engaged with the first hinge pin of the proximal arm and with the second hinge pin of the distal arm respectively.

By way of example, a balancer of this type may be of the type described in French patent No. 88 02 423 (published under No. 2 627 718).

A known balancer of this type, which is purely mechanical, is generally used to balance the forces acting on an arm acted upon by a load such as a tool. It results in strict balancing of the arm, whatever its angular position, and is capable of pivoting by 360°, allowing the load to describe a circular trajectory.

This known balancer affords the advantage of providing a sinusoidal torque with an excellent yield and a high bandwidth, in other words mechanical balancing with a short response time.

Therefore, when the two output shafts of the balancer are rotationally engaged with the hinge pin of the proximal arm and the hinge pin of the distal arm respectively, the balancing device according to the invention allows synchronous movement of the two arms during a single manoeuvre of the load, whatever the distribution of the loads on each of the two arms of the articulated mechanism.

Preferably, one of the two output shafts of the balancer forms the hinge pin of the proximal arm whereas the other output shaft is coupled to the hinge pin of the distal arm by transmission means.

Various mechanical means may be used for this purpose, in particular means having at least one deformable parallelogram.

According to a further characteristic of the invention, the proximal arm and the distal arm are the same length.

As a result, the load is able to move over a rectilinear trajectory with a range of movement corresponding to four times the length of each of the aforementioned arms.

According to a further characteristic of the invention, the device comprises an additional motorisation means formed by at least one actuator coupled to at least one moving part of the device.

A motorisation means of this type may be used to move the articulated mechanism from one of two positions, which include a service position and a storage position, to the other.

Preferably, these adjustment means comprise a mass which is capable of moving on the proximal arm or the distal arm.

The invention also provides that the device may comprise an additional motorisation means controlled by a force sensor placed at a position which is selected for assisting an operator in the case of a manual movement or for applying a constant force to a given part.

In a preferred application of the invention, the free end of the distal arm carries the bows of a railway pantograph capable of collecting the electrical energy from a catenary such that the load here is formed by the force exerted on the catenary by the bows.

In the case of application to a railway pantograph, it is advantageous if the device comprises at least one accessory, in particular an aerofoil, which is rotationally engaged with the second output shaft while being mounted either on this second output shaft or idly on the first output shaft, which has selected geometry and moves parallel to the distal arm with which it is rotationally engaged, this accessory being disposed on a radius of gyration such that its penetration of the air generates a torque equal and opposed to the torque of penetration of the air of the articulated mechanism (in other words of the pantograph here), these two torques cancelling one another in the connecting mechanics. A pantograph which is insensitive to the wind speed is produced in this way.

As mentioned hereinbefore, the balancing means of the invention, in a variation, may comprise motorisation means.

In a further embodiment intended, in particular, for a railway pantograph, a servocontrol motorisation means provides inertial forces associated with the movement, on the vertical axis, of the entirety of the structure. This is intended to prevent the force produced by the bows on the catenary from being disturbed by these movements. This servocontrol motorisation means will also be capable of compensating the imperfection of the torque defined by the abovementioned aerofoil or even to make up for its absence. This motorisation means comprises an electric motor coupled to an endless screw cooperating with a nut, this nut being carried by a crank coupled to either the first output shaft or the second output shaft, the servocontrol means being provided to control the electric motor on the basis of a control signal transmitted by a force sensor carried at the free end of the distal arm.

The endless screw is advantageously a reversible screw driven by the electric motor via a reduction gear, a clutch mechanism being interposed between the reduction gear and the endless screw.

The presence of this reduction gear allows the use of a large-pitch reversible endless screw with a high reverse yield. However, a screw having a smaller pitch, but no reduction gear, may also be considered.

The servocontrol means advantageously comprise a tachymetric dynamo driven by the electric motor and capable of transmitting a speed signal, a first operational amplifier (speed loop) receiving this speed signal and producing a first output signal, a second operational amplifier (current loop) receiving the first output signal and transmitting a second output signal, a power amplifier receiving this second output signal and transmitting an output current sent to the electric motor and from which the image of this output current is sent to the second operational amplifier, the control signal transmitted by the force sensor being applied to the input of the second operational amplifier (current loop).

It is also advantageous that the servocontrol motorisation means may be used as an ancillary system for the unfolding and folding operation.

This unfolding and folding mechanism is of particular interest when the free end of the distal arm carries the bows of a railway pantograph.

Preferably, this mechanism is capable of receiving a control signal applied to the first operational amplifier (speed loop) to bring about the folding or unfolding of the articulated mechanism. This signal will thus have priority over the signal from the force sensor brought back to the current loop.

It is also advantageous that this mechanism is capable of receiving an emergency signal applied to the first operational amplifier (speed loop) to bring about the folding of the articulated mechanism in an emergency. This signal will also have priority over the signal from the force sensor, brought back to the current loop.

This priority of the speed loop over the current loop prevails each time that the force of the bows on the catenary disappears for a significant time.

According to a further characteristic of the invention, the servocontrol means comprise corrective means capable of performing a corrective action between the control signal transmitted by the force sensor and the actual force applied to the load, in order to compensate the inertial forces associated with the mechanics placed downstream of the sensor, in particular with the mass of the bows in the case of a railway pantograph. These corrective means comprise differentiating means capable of differentiating the speed variations recorded on the tachymetric dynamo over time and applying them to the input of the second operational amplifier.

A further ancillary drive system distinct from the system described hereinbefore will allow the folding of the pantograph in the event of a breakdown of this first system.

In the following description, given merely as an example, reference will be made to the accompanying drawings, in which:

FIG. 3 is a side view of a balancing device according to a third embodiment of the invention applied to a railway pantograph;

FIG. 4 is a front view corresponding to FIG. 3;

Figure 1:
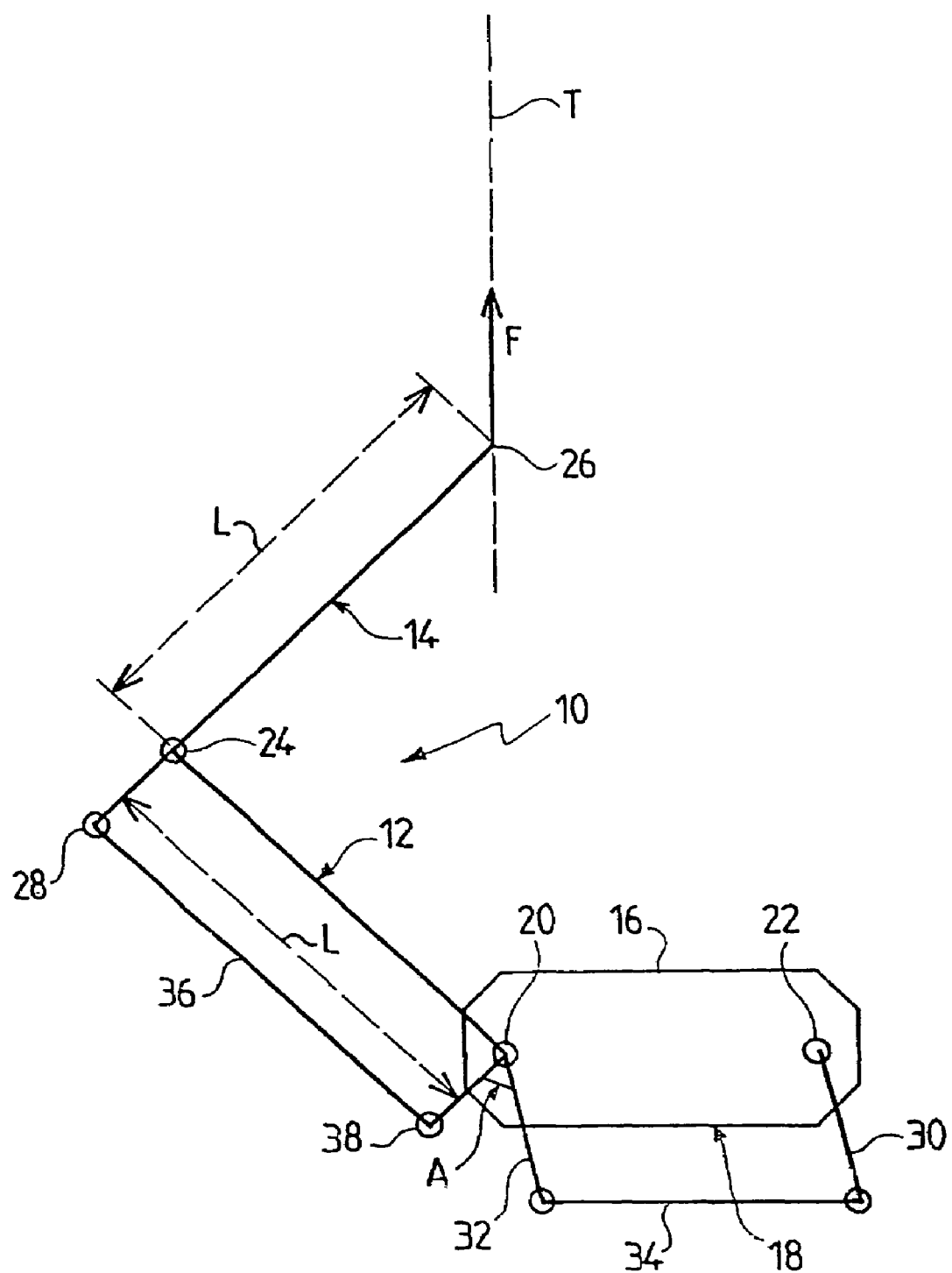
FIG. 1 is a diagram of a balancing device according to a first embodiment of the invention.

The balancing device shown in FIG. 1 comprises an articulated mechanism 10 formed by a proximal arm 12 and a distal arm 14. The proximal arm 12 is carried by a support 16 formed here by the frame or body of a balancer 18.

This balancer is advantageously of the type described in the aforementioned French patent No. 88 02423. It comprises two output pins or shafts 20 and 22 which are mutually parallel and, in the example, disposed horizontally. The balancer is capable of providing a sinusoidal torque and the two output shafts 20 and 22 are connected so as to have synchronised speeds of rotation, but in opposite directions.

The output shaft 20 is coincident with the hinge pin of the proximal arm 12. The distal arm 14 is carried by the proximal arm 12 and is keyed about the hinge pin 24 which extends parallel to the output shaft 20.

The distal arm 14 has a free end 26 capable of providing a force F and an opposite end 28 forming a hinge pin.

The proximal arm 12 is fixed to the output shaft 20 of the balancer 18 and is therefore rotationally engaged therewith.

A crank 30 is fixed to the output shaft 22 of the balancer and is also rotationally engaged therewith. As a result, the proximal arm 12 and the crank 30 rotate synchronously but in opposite directions.

A crank 32 is fixed on the output shaft 20 by bearings (not shown) which enable it to rotate freely on this shaft.

Furthermore, a connecting link 34 is fixed to the ends of the cranks 30 and 32 by bearings (not shown) which allow rotation and thus create a parallelogram which transmits the forces of the crank 30 to the crank 32.

The distal arm 14 is fixed to the end of the proximal arm 12 by bearings (not shown) which allow it to pivot freely and without stress about the pin 24.

The arm 14 has a length L between its end 26 and the hinge pin 24 which is equal to the length of the arm 12, as defined between the shaft 20 and pin 24.

A connecting rod 36 parallel to the proximal arm 12 is fixed on one side to a crank 38 and on the other side to the end 28 of the distal arm 14 via bearings (not shown), thus creating a second parallelogram which transmits the forces of the crank 38 to the distal arm 14. The cranks 32 and 38 are fixed to the output shaft 20 and are mounted freely rotatably about it but are rotationally engaged with one another, forming an angle A capable of preventing buttressing.

The output shafts 20 and 22 are synchronised in opposite directions and are indexed so that when the arm 12 is horizontal, the crank 38 is also horizontal (in either direction, depending on whether the connecting rod 36 is below or above the arm 12). As a result, the rotation of the output shafts 20 and 22 through 180° causes the free end 26 to move along a straight line over a distance or range equal to 4×L. This straight line corresponds to a rectilinear trajectory T which extends vertically in the example.

It will be appreciated that the variable angle bisector formed by the arms 12 and 14 therefore remains parallel to itself.

As the balancer 18 provides a sinusoidal torque, the force F transmitted to the end 26 is constant and always parallel to the direction indicated by the arrow. This force is equal to the sum of the maximum torques (arm 12 horizontal) given by the balancer 18 at the output shafts 20 and 22 while being reduced by the torque brought back by the weights of the various moving elements (arms, connecting rods, cranks, connecting links, plain or rolling bearings, etc. plus various on-board systems or tools) divided by the value 2×L (except when the arms 12 and 14 are vertical, upward or downward, where a buttressing phenomenon occurs.

This force may be used to balance a mass which will therefore be weightless over the entire trajectory T (a vertical trajectory here), or else to apply a force, for example the force which a current-collector pantograph bow must exert on a catenary.

Figure 2:
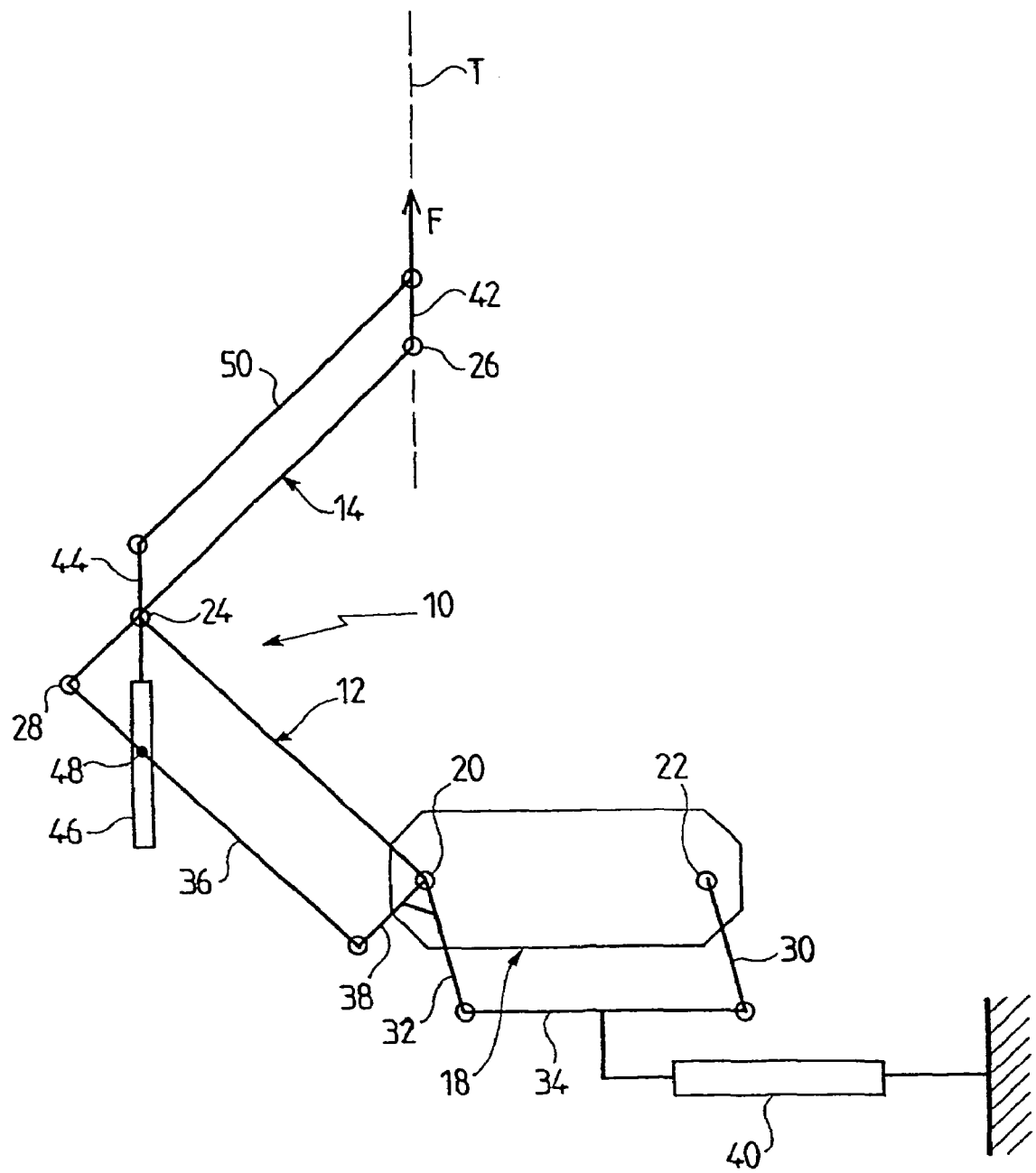
FIG. 2 is a diagram of a balancing device according to a second embodiment of the invention.

The device in FIG. 2 comprises the basic elements of the device in FIG. 1, like elements being designated by like reference numerals. It also includes an additional motorisation means 40 applied, in the example, to the connecting link 34 and usable for different purposes.

This additional motorisation means may be used, in particular, to move the articulated mechanism 10 from one of two positions, including a service position and a storage position, to the other. This motorisation means will be neutralised when the device is in the service or operating position.

In a variation, this additional motorisation means may also be used to balance additional masses which will not always be present or of which the weights are substantially different or to compensate an absence of additional mass. As an example, the main mass could be a gripper and the additional masses could be various parts, the motorisation means 40 being limited to the weight of the part present.

This additional motorisation means could also be used to make the end 26 pass through the desired movements, the motorisation means being limited to friction and inertia, to the exclusion of the out-of-balance load.

Any combinations of ancillary, balancing of additional masses and motorisation means may also be used.

If necessary, the device may be combined with a device for controlling an mechanical handling means with servocontrol, as taught by French patent application No. 0003047 in the name of the Applicants.

It will be appreciated that the additional motorisation means 40 may be of any type (pneumatic, hydraulic, electrical, etc.), linear or circular. In addition, its point of application is not limited to the connecting link 34 and it may be any part associated with the movement, including the output shafts 20 and 22 and even the free end 26 of the distal arm.

Furthermore, the device of FIG. 2 comprises means capable of imparting a constant orientation to a connecting link 42 carrying the load (force F). This connecting link 42 therefore extends in the direction of the aforementioned trajectory T.

This device comprises a crank 44 fixed to the end of the proximal arm 12 by rolling bearings and therefore freely rotatably relative thereto. At its lower end, this crank 44 carries an elongate part 46 comprising an oblong hole in which there slides a finger 48 fixed on the connecting rod 36 vertically to the hinge pin 24. When the finger 48 slides in the oblong hole, owing to the deformation of the parallelogram formed by the arms 12 and 14, the connecting link 38 and the connecting rod 36 during operation, the crank 44 remains vertical. A connecting rod 50 is fixed by rolling bearings, therefore freely rotatably, at one end to the crank 44 and, at its end, to the connecting link 42 so as to remain parallel to the arm 14 and therefore form a deformable parallelogram.

It is obviously possible to replace this sliding finger-type device with a parallelogram which seeks a given direction, possibly the vertical direction, between the output shaft 20 and a fixed point.

For certain applications, it is possible to construct, on the connecting link 42, a tool (not shown) which maintains a predetermined orientation whatever the position of its centre of gravity, and, in particular, a part-gripping tool which allows changes of orientation of this part.

It should be noted that the variation of the load or of the force desired at the end 26 (FIG. 1) may be achieved, not only via the motorisation means 40, but via the movement of a load along one of the arms 12 and 14. This movement may be effected by hand or by a motorisation means. It allows the mechanical torque associated with the weight of the moving elements and brought back to the device 18 to be modified.

Referring now to FIGS. 3 and 4, a balancing device according to the invention is shown which resembles that in FIG. 2 and is applied to a pantograph of a railway power unit. The elements common with those in FIG. 2 are designated by the same reference numerals. The device carries two railway bows 76 and 78 capable of coming into contact with a catenary (not shown).

This embodiment aims to improve the behaviour in horizontal forces, in particular those induced by the resistance to penetration through the air.

The actual structure of the pantograph allows excellent behaviour with regard to the lateral forces which occur perpendicularly to the direction of advance of the railway power unit, and this does not pose any particular problems.

A problem arises more specifically with regard to the forces created in the direction of travel of the railway power unit.

A balancer of the type described in the aforementioned French patent No. 88 02423 provides high values of direct and indirect yield, in other words values of approximately 98%. The high bandwidth of these mechanics imparts to the pantograph very good transfer of torque from one of the output shafts to the other. In fact, as these output shafts rotate in opposite directions, the balancer will reverse the direction of the transferred torque, from one output shaft to the other. This characteristic therefore allows a certain amount of stability to be imparted to the entire structure.

The device according to the embodiment in FIGS. 3 and 4 differs from that in FIG. 2 with regard to the means capable of imparting a constant orientation to the connecting link 42. The elongate part 46 comprising an oblong hole (FIG. 2) is replaced by a tie rod 80 which seeks its direction on the frame of the balancer.

In this case, the force created by the penetration of the bows 76 and 78 and of their supports through the air, as well as the friction on the catenary, do not affect the behaviour of the pantograph on the vertical axis. This is valid for all the mechanics situated at the end of the distal arm.

On the other hand, the force of penetration through the air of the proximal arm 12 and the distal arm 14 is not completely compensated. A torque equivalent to that produced by the force of penetration of the distal arm 14 applied to the end of the proximal arm 12 remains on the output shaft 20 (which supports the proximal arm).

This therefore results in either an increase or a reduction in the force exerted on the catenary by the bows, depending on the direction of travel of the power unit. This phenomenon therefore impairs good operation of the pantograph and should be taken into consideration so that it may be cancelled or so that its effects may at least be reduced.

A first solution would involve placing, on the second output shaft 22 of the balancer, a structure equivalent to that of the articulated mechanism carried by the first output shaft 20 and which would therefore create the same torque, these two torques cancelling one another out in the balancer.

A solution of this type comprises several drawbacks, in particular an increase in the weight of the structure, an increase in its inertia and twice the bulk when the pantograph is folded. What is more, this solution is very expensive.

To solve this problem, the invention proposes a further solution which involves modelling this second structure and replacing it with an accessory, in particular an aerofoil, which is aerodynamically equivalent to this second structure.

Referring to FIGS. 3 and 4, an accessory 82 of this type, of the aerofoil type here, is shown which has selected geometry and moves parallel to the distal arm 14 with which it is rotationally engaged.

This accessory 82 is disposed on a radius of gyration R such that its penetration through the air generates a torque equal and opposed to the torque of penetration through the air of the articulated mechanism 10 (pantograph), these two torques cancelling one another out in the connection mechanics of the balancer 18.

In the example, the accessory 82 comprises a profile 84 which forms an actual aerofoil and is fixed to the end of two levers 86 rotationally engaged with the cranks 30.

As a result, these two levers are set into rotation at the same time as the proximal arm, but in the opposite direction.

It has been seen hereinbefore that the residual torque was created by a force corresponding to the penetration through the air of the distal arm and applied to the end of the proximal arm.

The accessory 82 which is rotationally engaged with the second output shaft of the balancer provides identical frictional conditions as it takes to the air at the same angle as the distal arm with which it is also rotationally engaged and the variations of its lever arm are perfectly symmetrical with those of the proximal arm. It therefore creates a torque which is equivalent in type and value to the residual torque due to the penetration of the pantograph structure through the air. These two torques therefore cancel one another out through the mechanics of the balancer.

This modelling will obviously be adjustable, in particular with regard to the structure and geometry of the aerofoil and its radius of gyration, depending on the aerodynamic characteristics of the power unit and the pantograph.

In addition, the attachment of this system is complementary to all the points mentioned hereinbefore with reference to FIGS. 1 and 2, in particular the installation of a servo-control system for forces (see the motorisation means 90 described hereinafter), the adjustment of which it facilitates by limiting its role to control of the inertia of the pantograph.

The attachment of this accessory does not significantly affect the overall inertia of the pantograph. Its weight is fully accounted for by the balancer.

Finally, this accessory allows correction of the distortion due to the fact that, contrary to the hypotheses taken in the calculation and although the distal arm and the proximal arm have the same length, the force of penetration through the air of the distal arm is not identical to that of the proximal arm, in particular on account of the presence of a cowling on the power unit and of the connecting rod 36.

In a variation, the accessory may be mounted on the crank 32 which is in turn rotationally engaged with the second output shaft of the balancer, this arrangement reducing the bulk of the folded accessory. In this case, the accessory is mounted idly on the first output shaft 20.

More generally, any means of compensating the force of penetration through the air by the structure of the pantograph, rotationally engaged with the second output shaft of the balancer, may be disposed either on the first output shaft or on the second output shaft of the balancer or even on both.

The structure of the accessory is not limited to an aerofoil, as shown in FIGS. 3 and 4, but may resemble a structure closer to that of the distal arm, whose penetration through the air it models.

Figure 6:
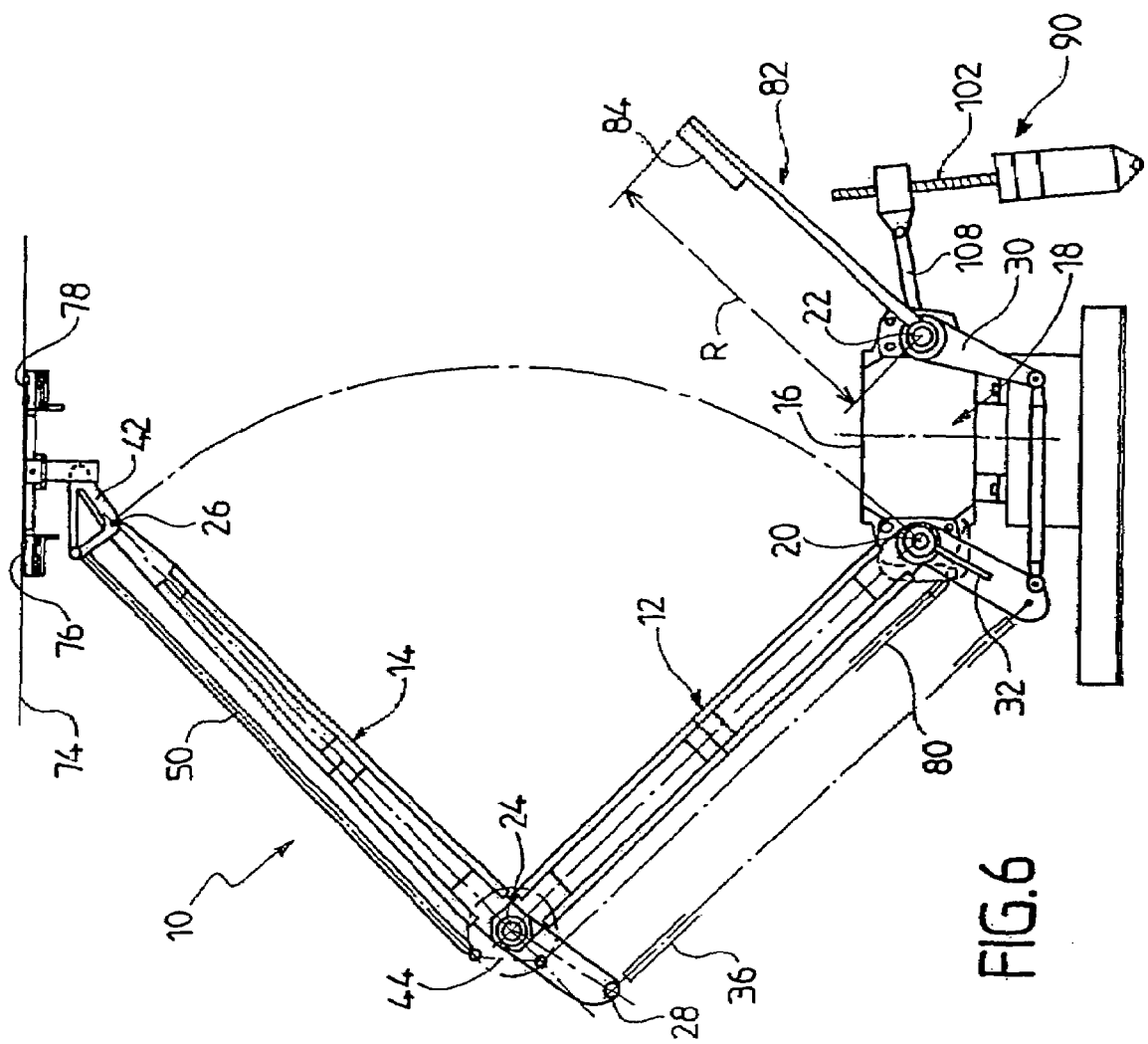
FIG. 6 is a view similar to FIG. 3 incorporating the motorisation means of FIG. 5.
Figure 5:
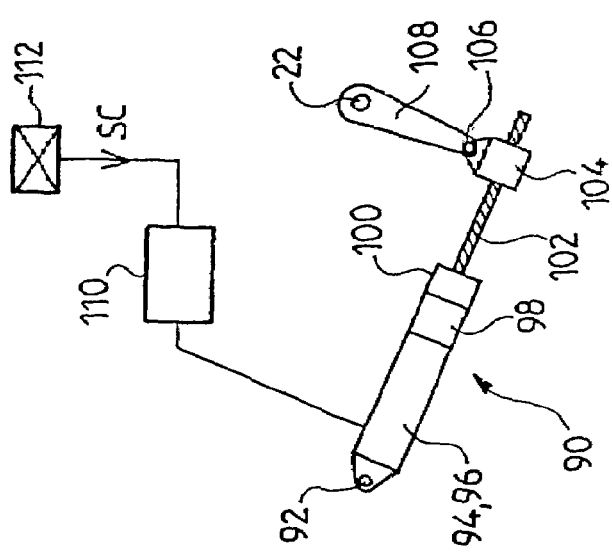
FIG. 5 shows the motorisation means according to the invention.

Referring now to FIG. 5, the motorisation means 90 used for the servocontrol of the articulated mechanism 10 are shown, this mechanism advantageously consisting of a railway pantograph, as shown in FIG. 6.

These motorisation means with servocontrol are advantageously combined with a mechanical balancer 18 having two output shafts 20 and 22 as described hereinbefore. These motorisation means 90 comprise an assembly which is articulated about a pin 92 and includes an electric motor 94 coupled to a tachymetric dynamo 96. Via a reduction gear 98 and a clutch 100, this motor 94 drives an endless screw 102 which cooperates with a nut 104. This nut 104 is articulated at 106 to the end of a crank 108 which is coupled to one of the output shafts 20 and 22 of the balancer 18. Advantageously, this coupling will insulate the electrical potential of the balancer (that of the catenary) from that of the endless screw (mass of the power unit).

A servocontrol circuit 110 which will be described hereinafter with reference to FIG. 7, controls the electric motor 94 on the basis of a control signal SC transmitted by a force sensor 112 carried at the free end of the distal arm 14 of the articulated mechanism 10. As mentioned hereinbefore, these motorisation means are advantageously used in the case of a railway pantograph, as shown in FIG. 6. The pantograph of FIG. 6 corresponds to that of FIGS. 3 and 4. In this particular example, the railway pantograph comprises an aerofoil 82 similar to the one described hereinbefore. The crank 108 is advantageously rotationally engaged with the aerofoil, in other words more particularly the levers 86 which are rotationally engaged with the output shaft 22 of the balancer 18.

The installation of this servocontrol means is intended, in particular, to address the problem of the dissociation of systems which generate pressures on the catenary 74 and control of the inertia of the pantograph structure. This is intended to overcome variations in parallelism between the catenary and the railway, whether they are due to the actual geometry of the line or to the oscillations which the passage of a first pantograph causes on the catenary and which have to be followed by any following pantographs.

These servocontrol motorisation means are mounted on the mechanical balancer 18 in the example. A mechanical balancer of this type intrinsically creates a sinusoidal torque which balances 98% of the mass of the structure. In the case of the pantograph, the induced kinematics for their part intrinsically create the force on the catenary with the same precision, whatever the unfolded position of the pantograph structure. In addition, low inertia and friction values of the balancer as well as its high bandwidth make it particularly suitable for a motorisation means of this type.

The pantograph structure constructed about the balancer 18 compensates, in perfect conditions, the disturbances of the horizontal forces of all types to which it is subjected. As a result, the relationship between the actuator and the force on the bows which it creates remains virtually independent of the speed of the train, the direction of travel of the pantograph and its unfolded height.

The motorisation means 90 substantially allows the inertial forces required for the vertical movement of the structure to be accommodated. These motorisation means have particularly high dynamic performance. If necessary, they can compensate the residual forces caused, in particular, by the penetration through the air of the pantograph structure, preferably in coordination with the aerofoil 82 described hereinbefore. This is why these motorisation means 90 are advantageously combined with the pantograph with the aerofoil, as shown in FIG. 6. Furthermore, these motorisation means similarly compensate, if necessary, all or a portion of the balancing or generate all or a portion of the forces of the bows on the catenary.

According to the invention, the kinematic chain of the servocontrol means is homokinetic. Therefore, whatever the position of the pantograph, the mechanical gain between the driving torque and the linear acceleration of the bows will be virtually constant.

These kinematics are achieved by recreating a connecting rod/crank system (crank 108) which transforms a constant force into a sinusoidal torque, which torque is retransformed into a constant force by the pantograph structure in the region of the bows 76 and 78.

Under these circumstances, the sinusoid of the crank 108 is synchronised, in other words in phase, with that of the pantograph.

The reduction gear 98 (FIG. 5) advantageously consists of a reduction gear having trains of pinions in an inverse relationship with that of the amplification between the pantograph structure and the crank (crank 108) of the motorisation means.

The endless screw 102 is advantageously a screw of the reversible type with a high reverse yield. Accordingly, it is preferable to use a ball screw with rolled threads, preferably a screw having a diameter of 30 mm and a pitch of 30 mm.

In the example shown, the screw is reversible, and this is why a reduction gear is also provided. In a variation, however, it is possible to use a screw with a smaller pitch without a reduction gear but of which the reverse yield would be lower.

The clutch 100 allows the motorisation means 90 to be disengaged, for example in the event of a breakdown thereof, to allow impaired travel of the pantograph. This means that the performance of the pantograph would be similar to that of a pantograph without servocontrol in such a mode of operation.

Figure 7:
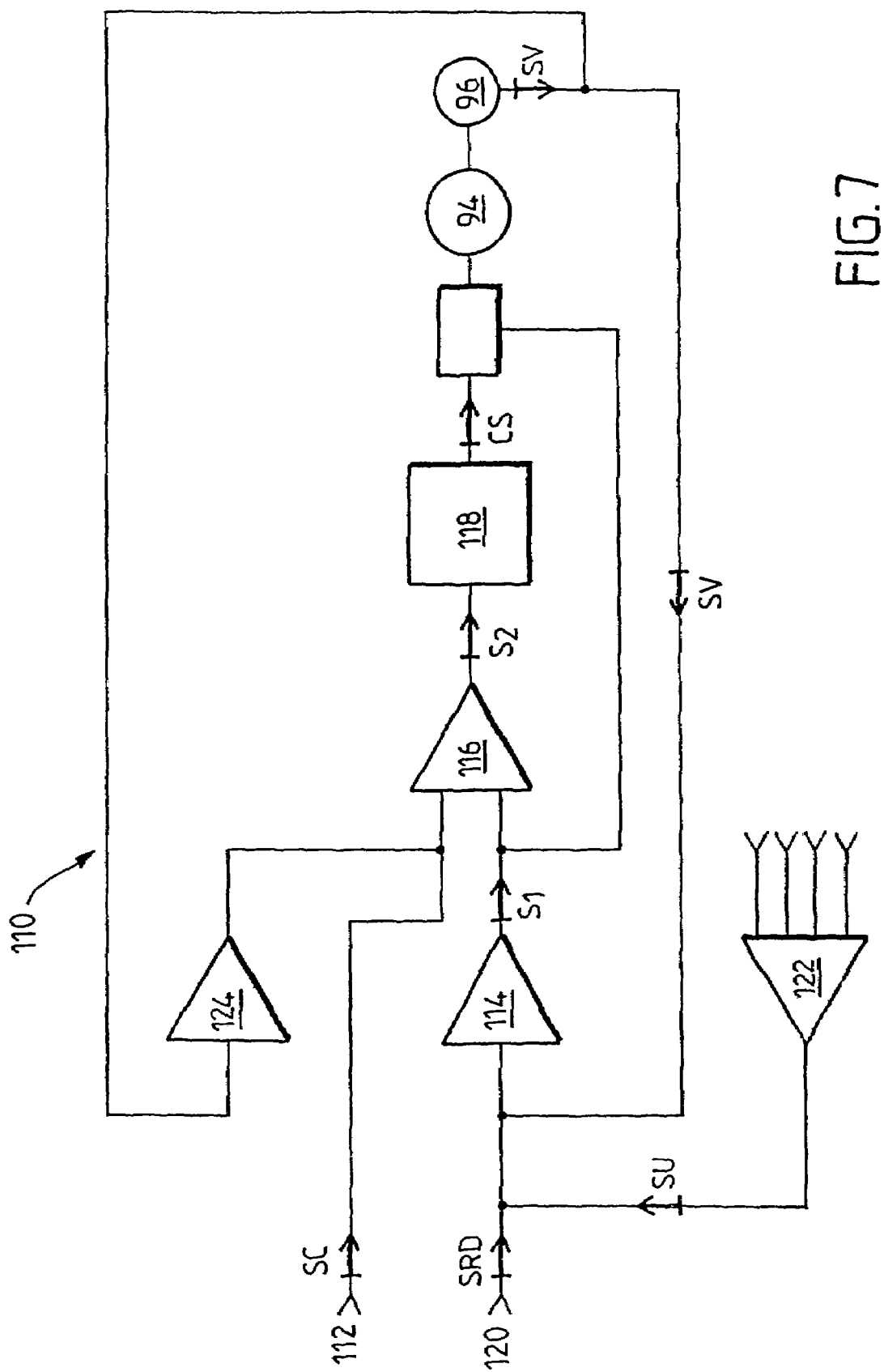
FIG. 7 shows a servocontrol circuit forming part of the motorisation means of FIGS. 5 and 6.

Referring now to FIG. 7, an example of servocontrol means 110 will be described. FIG. 7 shows the motor 94 and the tachymetric dynamo 96. The tachymetric dynamo driven by the motor transmits a speed signal SV.

The circuit 110 also comprises a first operational amplifier 114 (speed loop) receiving this speed signal SV and producing a first output signal S1 which is transmitted to a second operational amplifier 116 (current loop). This second operational amplifier transmits a second output signal S2 which is received by a power amplifier 118 which transmits an output current CS sent to the electric motor 94 and of which the image is sent to the second operational amplifier 116. The force sensor 112 (carried by the pantograph bows) transmits a control signal SC which is applied to the input of the second operational amplifier 116.

Thus, the control of the bow/catenary force is applied to the region of the current loop of the servocontrol means (operational amplifier 116). This results in a very short response time of the assembly and management of perfectly homogeneous values since the torque transmitted by the motor 94 is proportional to the control signal of this loop.

An unfolding and folding operation 120 is also provided, which is capable of receiving a control signal SRD applied to the first operational amplifier (speed loop) to bring about the folding or unfolding of the articulated mechanism 10, in other words in the example of the pantograph.

In addition, an emergency signal SU is sent by a safety device 122 operating in the event of breakage of the catenary. This safety device sends the emergency signal to fold the pantograph structure in any of the following cases (given as examples):

prolonged disappearance of the bow/catenary force in the operating phase, ill-timed arrival of the structure at its high point, prolonged disappearance of the current supplying the power unit, transmission of the emergency signal by any other detection system.

In certain cases it may be worth performing a corrective action between the signal SC transmitted by the force sensor and the actual force exerted by the bows on the catenary. Therefore, it takes account of the inertial forces due to the mechanics placed downstream of the sensor and in particular to the bows. Corrective means 124 are provided for this purpose, which are capable of transmitting a corrective action between the control signal SC transmitted by the force sensor 112 and the actual force exerted on the load F, or on the catenary in this case. These corrective means comprise differentiating means capable of differentiating the variations of speed recorded on the tachymetric dynamo 96 over time and of applying them to the input of the second operational amplifier 116. This signal, which is linear on acceleration, will generate a current and therefore a torque which is capable of compensating the above-defined inertial forces which are themselves proportional to said acceleration.

The servocontrol system used as an ancillary for the folding or unfolding of the structure, as already mentioned, is duplicated by another system for folding the pantograph in the event of failure of the first system, for example by the additional motorisation means 40 shown in FIG. 2.

It must be understood that the motorisation means with servocontrol, as described hereinbefore, may be used in combination with other balancing means. In addition, they are not limited to use with an articulated mechanism of the railway pantograph type.

To assist understanding of the drawing (FIG. 6), the servocontrol motorisation system has been disposed vertically on the axis carrying the aerofoil. In practice, and to save space, this motorisation system will be mounted on either of the two output shafts of the balancer and will be disposed horizontally at its side.

It will be appreciated that the subject of the invention has numerous applications, in particular for handling devices, transfer devices, railway pantographs, etc.

The balancing means of the device of the invention advantageously employ a balancer of the type described by the aforementioned French patent No. 88 02 423.

It is obviously possible to use other balancing means, providing that they have a high bandwidth.

The invention claimed is:

1. Device for balancing a force, the device comprising:
an articulated mechanism including:
a proximal arm carried by a support and keyed on a first hinge pin; and
a distal arm carried by the proximal arm and keyed on a second hinge pin extending parallel to the first hinge pin, the distal arm having a free end carrying a load;
a balancer including:
a first high bandwidth balancing means having a first output shaft and acting on the proximal arm; and
a second high bandwidth balancing means having a second output shaft and acting on the distal arm ; and
a high bandwidth coordinating means interposed between the first high bandwidth balancing means and the second high bandwidth balancing means to coordinate a rotational movement of the proximal arm with a rotational movement of the distal arm.

2. The device of claim 1,
wherein the balancer is capable of providing a sinusoidal mechanical torque,
wherein a speed of rotation of the first output shaft is synchronized with a speed of rotation of the second output shaft,
wherein a direction of rotation of the first output shaft is opposite to a direction of rotation of the second output shaft, and
wherein the first output shaft is rotationally engaged with the first hinge pin and the second output shaft is rotationally engaged with the second hinge pin.

3. Device according to claim 1 wherein the balancing means comprise motorisation means.

4. The device of claim 1,
wherein the first output shaft forms the first hinge pin of the proximal arm , and
wherein the second output shaft is coupled to the second hinge pin of the distal arm by a transmission means, the transmission means having at least one deformable parallelogram.

5. The device of claim 1, wherein the proximal arm and the distal arm have a same length.

6. Device according to claim 1, further comprising an additional motorisation means formed by at least one actuator coupled to at least one moving part of the device.

7. Device according to claim 6, wherein the additional motorisation means is capable of moving the articulated mechanism from one of two positions, which include a service position and a storage position, to the other position.

8. Device according to claim 1, further comprising an additional motorisation means controlled by a force sensor placed at a position which is selected for assisting an operator in case of a manual displacement or to apply a constant force to a given part.

9. Device according to claim 1, wherein the free end of the distal arm carries the bows of a pantograph capable of collecting the electrical energy from a catenary such that the load is formed by the force exerted on the catenary by the bows.

10. Device according to claim 9, further comprising at least one accessory rotationally engaged with the second output shaft while being mounted either on the second output shaft or idly on the first output shaft, which has a selected geometry and moves parallel to the distal arm with which it is rotationally engaged, the accessory being disposed on a radius of gyration such that its penetration of the air generates a torque equal and opposed to the torque of penetration of the air of the articulated mechanism.

11. Device according to claim 1, further comprising a servocontrol motorisation means comprising an electric motor coupled to an endless screw cooperating with a nut, the nut being carried by a crank coupled to one of the first output shaft and the second output shaft, and a servocontrol means to control the electric motor using a signal from a force sensor carried at the free end of the distal arm.

12. Device according to claim 11, wherein the endless screw is a reversible screw driven by the electric motor via a reduction gear and a clutch mechanism interposed between the reduction gear and the endless screw.

13. Device according to claim 11, wherein the servocontrol means comprise a tachymetric dynamo driven by the electric motor and capable of transmitting an output signal, a first operational amplifier receiving the speed signal and producing a first output signal, a second operational amplifier receiving the first output signal and transmitting a second output signal, a power amplifier receiving the second output signal and transmitting an output current sent to the electric motor wherein a control signal transmitted by the force sensor is applied to the input of the second operational amplifier.

14. Device according to claim 13 wherein the servocontrol motorisation means forms an ancillary system for folding and unfolding of the articulated mechanism.

15. Device according to claim 14, wherein the ancillary system for folding and unfolding is capable of receiving a control signal applied to the first operational amplifier to bring about the folding or unfolding of the articulated mechanism, the control signal having priority over the signal from the force sensor brought to the current loop.

16. Device according to claim 14, wherein the ancillary system for folding and unfolding is capable of receiving an emergency signal applied to the first operational amplifier to bring about the folding of the articulated mechanism in an emergency, the emergency signal having priority over the signal from the force sensor brought to the current loop.

17. Device according to claim 13, wherein the servocontrol means comprise corrective means capable of performing a corrective action between the control signal transmitted by the force sensor and the actual force applied to the load, the corrective means comprising differentiating means capable of differentiating the speed variations recorded on the tachymetric dynamo over time and applying the speed variations to the input of the second operational amplifier.

* * * * *